(12) United States Patent
Porfiri et al.

(10) Patent No.: US 10,516,770 B2
(45) Date of Patent: Dec. 24, 2019

(54) TRANSMITTING ENTITY AND METHOD PERFORMED THEREBY FOR TRANSMITTING ONE OR MORE DATA PACKETS TO A RECEIVING ENTITY

(71) Applicant: TELEFONAKTIEBOLAGET LM ERICSSON (PUBL), Stockholm (SE)

(72) Inventors: Claudio Porfiri, Stockholm (SE); Carlo Vitucci, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/763,593

(22) PCT Filed: Oct. 13, 2015

(86) PCT No.: PCT/EP2015/073649
§ 371 (c)(1),
(2) Date: Mar. 27, 2018

(87) PCT Pub. No.: WO2017/063672
PCT Pub. Date: Apr. 20, 2017

(65) Prior Publication Data
US 2018/0270335 A1 Sep. 20, 2018

(51) Int. Cl.
*H04L 29/06* (2006.01)
*H04W 28/06* (2009.01)
*H04L 29/08* (2006.01)

(52) U.S. Cl.
CPC .......... *H04L 69/28* (2013.01); *H04W 28/065* (2013.01); *H04L 69/326* (2013.01)

(58) Field of Classification Search
None
See application file for complete search history.

(56) References Cited

U.S. PATENT DOCUMENTS

| | | | |
|---|---|---|---|
| 7,839,876 B1 * | 11/2010 | Goel | ............ H04L 47/10 370/412 |
| 8,446,835 B2 | 5/2013 | Baucke et al. | |

(Continued)

FOREIGN PATENT DOCUMENTS

| | | | |
|---|---|---|---|
| EP | 2002609 A1 | 12/2008 | |
| WO | WO-0227991 A1 * | 4/2002 | ........... H04L 1/0007 |

OTHER PUBLICATIONS

M. Suznjevic, et al., "Delay limits and multiplexing policies to be employed with tunneling compressed multiplexed traffic flows", draft-suznjevic-tsvwg-mtd-tcmtf-01, https://tools.ietf.org/id/draft-suznjevic-tsvwg-mtd-tcmtf-01.html, Transport Area Working Group, IETF, Jun. 14, 2013. (Year: 2013).*

(Continued)

*Primary Examiner* — Brian S Roberts
*Assistant Examiner* — Cassandra L Decker
(74) *Attorney, Agent, or Firm* — Patent Portfolio Builders, PLLC

(57) ABSTRACT

A transmitting entity and a method performed thereby for transmitting one or more data packets to a receiving entity is provided. The transmitting entity and the receiving entity are operable in a communication network. The method performed by the transmitting entity comprises receiving, from an application, a user layer packet, ULP, to be transmitted by means of a transport layer packet, TLP, to the receiving entity. The method further comprises bundling the received ULP together with one or more additional received ULPs in a TLP when a rate of incoming data, bytes or ULPs from the application meets a threshold; and transmitting the TLP to the receiving entity.

11 Claims, 5 Drawing Sheets

(56) References Cited

U.S. PATENT DOCUMENTS

| | | | |
|---|---|---|---|
| 2010/0135326 A1* | 6/2010 | Ray | H04W 28/065 370/474 |
| 2011/0019557 A1* | 1/2011 | Hassan | H04L 47/10 370/252 |
| 2011/0199899 A1 | 8/2011 | Lemaire et al. | |
| 2011/0292815 A1* | 12/2011 | Baucke | H04L 49/90 370/252 |

OTHER PUBLICATIONS

International Search Report and Written Opinion, dated Jun. 27, 2016, from corresponding PCT Application No. PCT/EP2015/073649.

* cited by examiner

TRANSMITTING ENTITY AND METHOD PERFORMED THEREBY FOR TRANSMITTING ONE OR MORE DATA PACKETS TO A RECEIVING ENTITY

TECHNICAL FIELD

The present disclosure relates to communication and in particular to transmission of one or more data packets to a receiving entity.

BACKGROUND

The adoption of packet transport technology is flexible enough for many applications. Some of those applications have strong requirement on end-to-end, E2E, delay, so they use a transport level packet per each information unit. Other applications have less restrictive E2E delay requirement, so they may use a transport level packet for transporting as many information units as possible. The technology that allows gathering many information units on the same transport level packet (toward the same destination) is known as "bundling" and permits a better usage of transport network and processing resources. It is well known that, under specific traffic and incoming bandwidth profile, bundling could significantly reduce resource usage, causing a better utilisation ratio of the Transport Layer.

Unluckily, bundling requires or causes a fixed delay in transporting the information units, time needed by the bundling itself to decide when to round-up the received information units and send them in the same transport level packet. This delay is unwanted, especially with a low incoming bandwidth rate when the delay may become quite intrusive.

Bundling is based on timing and size, meaning that on each request for sending a packet from an upper level protocol, e.g. an application, the transport level protocol will start time supervision. Further requests from upper level protocol will be gathered within the same transport level packet until the timer supervision expires, or the transport level packet is full, in both cases the packet will be sent.

SUMMARY

The object is to obviate at least some of the problems outlined above. In particular, it is an object to provide a transmitting entity and a method performed by the transmitting entity for transmitting one or more data packets to a receiving entity. These objects and others may be obtained by providing a transmitting entity and a method performed by a transmitting entity according to the independent claims attached below.

According to an aspect a method performed by a transmitting entity for transmitting one or more data packets to a receiving entity is provided. The transmitting entity and the receiving entity are operable in a communication network. The method performed by the transmitting entity comprises receiving, from an application, a user layer packet, ULP, to be transmitted by means of a transport layer packet, TLP, to the receiving entity. The method further comprises bundling the received ULP together with one or more additional received ULPs in a TLP when a rate of incoming data, bytes or ULPs from the application meets a threshold; and transmitting the TLP to the receiving entity.

According to an aspect, a transmitting entity for transmitting one or more data packets to a receiving entity is provided. The transmitting entity and the receiving entity are operable in a communication network. The transmitting entity is configured for receiving, from an application, a ULP, to be transmitted by means of a TLP, to the receiving entity; bundling the received ULP together with one or more additional received ULPs in a TLP when a rate of incoming data, bytes or ULPs from the application meets a threshold; and transmitting the TLP to the receiving entity.

The transmitting entity and the method performed thereby have several possible advantages. One possible advantage is that adaptive bundling may provide a better Central Processing Unit, CPU, resource utilisation than no-bundling option at a similar latency. Another possible advantage is that adaptive bundling may provide a higher traffic capacity than no-bundling and a better latency with high traffic figures. Still a possible advantage is that adaptive bundling may provide latency than any other bundling mechanism with low and medium traffic figures, and the same latency than other bundling mechanism at high traffic figures. Yet a possible advantage is that adaptive bundling may provide the possibility to tune-up the bundling feature according to the actual CPU utilisation, thus optimising the resource utilisation.

BRIEF DESCRIPTION OF DRAWINGS

Embodiments will now be described in more detail in relation to the accompanying drawings, in which.

DETAILED DESCRIPTION

Briefly described, a transmitting entity and a method performed thereby for transmitting one or more data packets to a receiving entity are provided. The transmitting entity has the option of employing bundling of packets, from e.g. an application to be transmitted to the receiving entity, into transport layer packets. Opposite to prior art, the bundling is not fixed to on or off, active or inactive with regard to e.g. Quality of Service or delay requirements. Instead, the bundling of user layer packets, ULPs into transport layer packets, TLP is adaptive meaning that the decision whether to bundle one or more ULPs into one TLP is taken based on current characteristics of e.g. traffic load of the transmitting entity. By traffic load is meant the rate of ULPs or bytes per second that is to be transmitted to the receiving entity.

Different services, traffic, applications etc. may have different requirements on e.g. delay. Depending on those different requirements, some types of services, traffic, applications etc. may be transmitted using bundling and some may not. In this disclosure, only packets associated with types of services, traffic, applications etc. that may be bundled are considered. Packets associated with types of services, traffic, applications etc. that may not be bundled are not affected by the method and/or transmitting entity disclosed herein.

Embodiments herein relate to a method performed by a transmitting entity for transmitting one or more data packets to a receiving entity, wherein the transmitting entity and the receiving entity are operable in a communication network. Different embodiments of such a method will now be described with reference to FIGS. 1a and 1b.

Figure 1A:
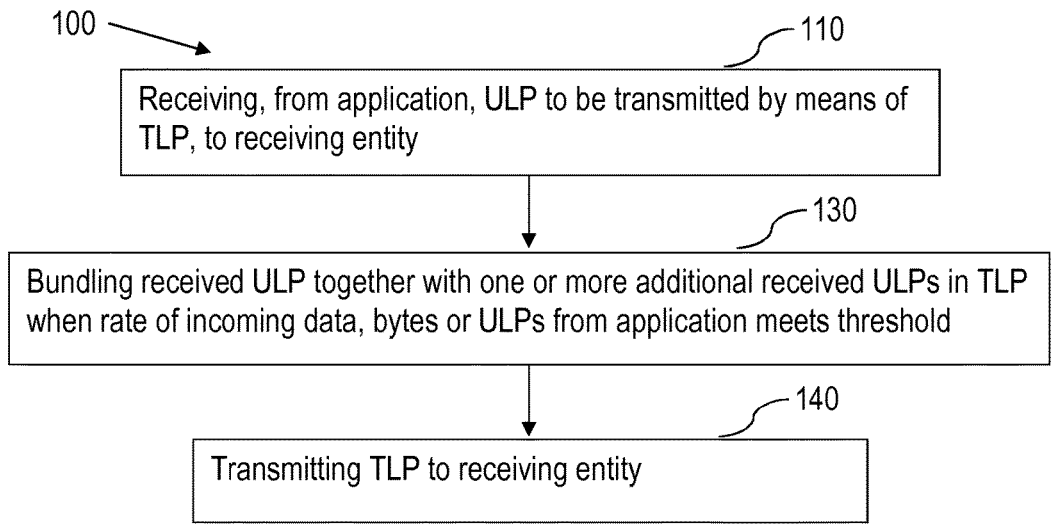
FIG. 1a is a flowchart of a method performed by a transmitting entity for transmitting one or more data packets to a receiving entity according to an exemplifying embodiment.

FIG. 1a illustrates the method 100 comprising receiving 110, from an application, a user layer packet, ULP, to be transmitted by means of a transport layer packet, TLP, to the receiving entity. The method further comprises bundling 130 the received ULP together with one or more additional received ULPs in a TLP when a rate of incoming data, bytes or ULPs from the application meets a threshold; and transmitting 140 the TLP to the receiving entity.

The transmitting entity may be a variety of different devices, arrangements or nodes. An example of a transmitting entity is a network node such as e.g. a base station, a Node B, an evolved Node B, an access point, a radio base station etc., wherein the receiving entity may be a wireless device such as e.g. a user equipment, mobile phone, smartphone, personal digital assistant, laptop or any other device or arrangement (e.g. a vehicle) comprising means for wireless communication with the transmitting entity.

Generally, in communication systems, or communication networks, two entities that communicate do so over a communication medium, e.g. copper wire, optical fibre or over the air. The two entities employ the same protocols in order to "understand" each other, and generally, the two entities employ a plurality of protocols that are on top of each other. For example, an application on a communication device, which may be the transmitting entity, generate information that is to be delivered to a recipient on another communication device, which may be the receiving entity. Generally, the application on the transmitting entity, and the recipient on the receiving entity, are on top of a stack of protocol, wherein the lowest or the couple of lowest protocol(s) is/are generally referred to as a transport protocol. Thus, when the application wants to transmit data to the recipient, the application employs a first protocol, which may be referred to as a user layer protocol. The user layer protocol will then put the data to be sent from the application in a user layer packet, ULP. Then the user layer protocol "hands the ULP down" to a protocol below. The protocol below may be the transport protocol, or there may be one or more intermediate protocols. Generally, an intermediate protocol receives a packet from a protocol "above in the protocol stack" and inserts it in a packet associated with that protocol and hands the packet of said intermediate protocol down to a protocol "below in the protocol stack".

For simplicity, in this disclosure, the method is described as if there are no intermediate protocol, however it is pointed out that there may be one or more intermediate protocols in between the user layer protocol that "sends" or delivers the ULP to the transport protocol, which in turn is to transmit the ULP to the receiving entity by means of the TLP.

Thus, the transmitting entity receives 110, from the application, the ULP to be transmitted by means of the TLP to the receiving entity. The application may be comprised in the transmitting entity or coupled to the transmitting entity either by wire, by coupling contact or wirelessly. By receiving in this case is meant that the transport layer protocol of the transmitting entity receives the ULP from the application.

The transmitting entity may either bundle the ULP together with one or more other ULPs in the TLP or simply insert the ULP in the TLP so that the ULP is the only packet in the TLP. There may be different criteria for employing bundling or not as will be discussed in more detail below. An example of a criterion is the rate of incoming data, bytes or ULPs from the application.

The transmitting entity thus bundles 130 the received ULP together with one or more additional received ULPs in the TLP when the rate of incoming data, bytes or ULPs from the application meets the threshold. Generally, bundling comprises employing a supervision timer that defines the maximum delay the transmitting entity may introduce to the transmission by waiting the length of the supervision timer for possible other additional ULPs until transmitting the TLP to the receiving entity. In case the TLP gets full before the supervision timer expires, or lapses, the transmitting entity will transmit the TLP as it gets full. Thus, if the incoming rate of incoming data, bytes or ULPs from the application is relatively low, it is relatively likely that the supervision timer will have time to expire most of the times to trigger the transmission of the TLP, whereas of the incoming rate of incoming data, bytes or ULPs from the application is relatively high, it is relatively likely that the TLP will become full before the supervision timer lapses. Consequently, a relatively low rate of incoming data, bytes or ULPs from the application may result in a longer delay at the transmitting entity than a relatively high rate. Thus, in the manner described above, the bundling is adaptive depending on one or more criteria.

The transmitting entity then transmits 140 the TLP to the receiving entity.

The method performed by the transmitting entity may have several possible advantages. One possible advantage is that adaptive bundling may provide a better Central Processing Unit, CPU, resource utilisation than no-bundling option at a similar latency. Another possible advantage is that adaptive bundling may provide a higher traffic capacity than no-bundling and a better latency with high traffic figures. Still a possible advantage is that adaptive bundling may provide latency than any other bundling mechanism with low and medium traffic figures, and the same latency than other bundling mechanism at high traffic figures. Yet a possible advantage is that adaptive bundling may provide the possibility to tune-up the bundling feature according to the actual CPU utilisation, thus optimising the resource utilisation.

Figure 1B:
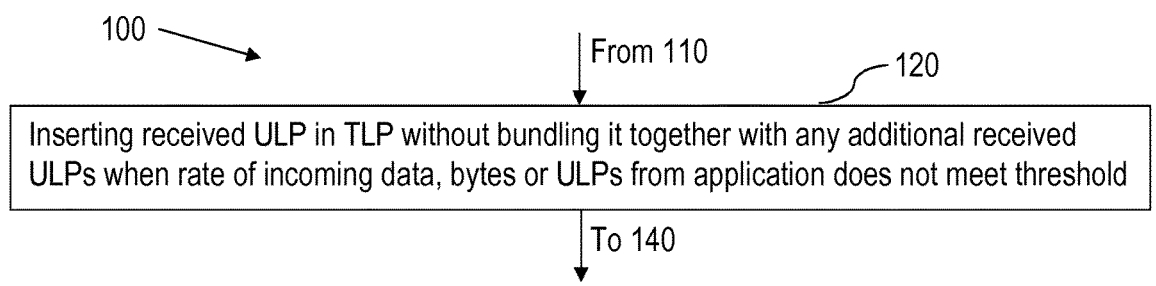
FIG. 1b is a flowchart of a method performed by a transmitting entity for transmitting one or more data packets to a receiving entity according to another exemplifying embodiment.

The method 100 may further comprise, as illustrated in FIG. 1b, inserting 120 the received ULP in the TLP without bundling it together with any additional received ULPs when the rate of incoming bytes or ULPs does not meet the threshold, and transmitting 140 the TLP to the receiving entity.

Depending on different criteria, as stated above, the transmitting entity may determine not to bundle the received ULP together with other ULP(s) in one TLP. Instead, the ULP is inserted in the TLP alone and transmitted to the receiving entity immediately.

Thus, if the rate of incoming bytes or ULPs does not meet the threshold, the transmitting entity does not employ bundling. Again, by employing bundling when the rate of incoming bytes or ULPs meets the threshold and not employing bundling when the rate of incoming bytes or ULPs does not meet the threshold, the adaptive bundling is achieved.

The bundling 130 may comprise determining the rate of incoming data, bytes or ULPs from the application.

The receiving entity may receive varying rates of incoming data, bytes or ULPs from the application. At a first point in time the rate may be relatively high and at a second point in time the rate may be relatively low. Since the transmitting entity employs bundling depending on whether or not the rate of incoming bytes or ULPs meets the threshold, the transmitting entity may determine the rate of incoming data, bytes or ULPs from the application.

The ULPs may be of different size so the rate of incoming data is thus a more accurate measure of actual amount of traffic/information that is to be transmitted compared to the rate of incoming ULPs. However, the rate of incoming ULPs may still serve as a measure of amount of traffic/information that is to be transmitted.

The threshold may be determined at least partly based on whether the bundling scheme is based on pre-bundling or post-bundling, wherein (a) pre-bundling comprises starting a supervision timer at the reception of the ULP from the application and waiting until the timer expires or the TLP is full before transmitting the TLP, and (b) post-bundling comprises transmitting the ULP as soon as it is received from the application in the TLP, starting the supervision timer and waiting until the supervision timer expires or the TLP is full until a subsequent TLP is transmitted comprising one or more ULPs.

There are different types of bundling, (a) pre-bundling and (b) post-bundling. In (a) pre-bundling, the transmitting entity starts the supervision timer as the ULP is received from the application if the received ULP is to be bundled. Whether or not the ULP is to be bundled or not depends on e.g. whether the rate of incoming data, bytes or ULPs from the application meets the threshold or not. In (b) post-bundling, if the supervision timer is not running at reception of the ULP from the application, the transmitting entity may transmit the ULP and then start the supervision timer so that subsequent ULPs that are received during the running of the supervision timer are delayed in the transmitting entity until either the supervision timer expires or the TLP is full, wherein the TLP is transmitted to the receiving entity and the supervision timer is stopped and reset.

The threshold may be set to different values depending whether the bundling scheme is based on pre-bundling or post-bundling.

The threshold may be determined at least partly based on one or more of (i) a supervision timer indicating a period of time the network node should wait, unless the TLP is full, before transmitting one or more received ULPs, (ii) the size of the TLP, (iii) the size of the ULP, (iv) the number of ULPs, (v) the rate of incoming data, bytes or ULPs, (vi) computational cost for not employing bundling, (vii) computational cost for employing bundling, (viii) computational cost for the supervision timer, (ix) computational delay for not employing bundling, and (x) computational delay for employing bundling.

There may be different factors affecting the efficiency and introduced delay by employing bundling, wherein the value, settings or policy of the threshold may vary depending on various circumstances. Below, the supervision timer is denoted Ts, the size of the TLP is denoted Ps, the size of the ULP is denoted Us, the number of ULPs is denoted Up, the rate of incoming data (in bytes/s) is denoted Ar, the computational cost for not employing bundling is denoted Cnb, the computational cost for employing bundling is denoted Cb, the computational cost for the supervision timer is denoted Ct, the computational delay for not employing bundling is denoted Dnb and the computational delay for employing bundling is denoted Db.

In case of no bundling, on each arrival of a ULP, a new TLP is generated, then all related calculations are done and the TLP may be transmitted. The computational cost for transmitting the TLP in this case is a direct function of the rate of incoming data, bytes or ULPs, Ar. Since the computational cost depending on ULP is the same for any case, with or without bundling, only the computational cost due to the TLP needs to be considered. Assuming that a constant number K of instructions are executed per TLP, then Cnb=K. The computational delay for no bundling case, Dnb, is the time that the delivery of TLP due to the queue in a computing unit, that is the time spent for calculating Cnb. Such a delay may be calculated as a clock function, Y, of Cnb. Consequently, Dnb=Y*Cnb=Y*K. high values of Ar cause queueing that affect the delay, thus for high Ar, Dnb is proportional to Ar, whereas for low Ar, the value of Db is constant.

In case of bundling, the supervision timer, Ts, runs whenever a new ULP is received from the application, this needs to be calculated as contributing to the computational cost. Bundling may work in three different ways, depending on Ts, Ps, Us and Ar. Calculating Mn as the maximum number of ULPs that fit into a TLP may be according to Mn=Ps/Us, and n as the current number of User Layer Packets that fit into a Transport Layer Packet:

$$n = \text{MAX}\left(Mn, \frac{Ps}{Up(t) * Us}\right).$$

Low arrival rate, Ar, may e.g. be defined as when $$< \frac{1}{Ts},$$

that is when the time of ULP arrival is less that Ts, each UL packet is delivered with fixed delay Ts. In this case, the computational cost for bundling, Cb, may be composed by the computational cost for the supervision timer, Ct, that runs on every ULP and the constant number K of instructions that are executed per TLP so that Cb=K+Ct. For low Ar, the cost for bundling may be higher than the cost for no bundling. In Pre-Bundling, ULP experiences a fixed delay that can be calculated as Db=Ts. In Post Bundling, ULP experiences a fixed delay due to Computational Load, which is similar to the no bundling case Db=Y*K*Ct. This implies that for low Ar, no bundling may be better than bundling both for computational costs and introduced delay, and this is due to the computational cost of the Ts timer.

Medium arrival rate, Ar, may e.g. be defined as when $$\frac{1}{Ts} \leq Ar \leq \frac{Mn}{Ts}$$

and then the scenario is different, as the Ts timer is running continuously and the Ar is high enough to allow gathering ULPs within the same TLP. In such case the cost for bundling becomes Cb=Ct+K/Mn. Apart from the fixed contribution from Ct, the computational cost for bundling, Cb, is lower than no bundling, and this cost is not depending by Ar, but only on n. In pre-bundling, the average delay towards ULP introduced by bundling becomes Db=Ts/n, and the maximum delay is Ts. In post bundling, the average delay towards ULP introduced by bundling becomes $$Db = \frac{\left(Ts - \frac{1}{Ar}\right)}{n}.$$

The maximum delays in post bundling is $$Db = Ts - \frac{1}{Ar}.$$

At high arrival rate, Ar, may e.g. be defined as when $$Ar > \frac{Mn}{Ts},$$

there's a third scenario, because time bundling may be replaced by size bundling, meaning that a TLP will be delivered as soon as enough ULPs will be received that fill that TLP. In such case still the cost for timer is paid by bundling, and the total computational cost becomes Cb=Ct+K*Ar/Mn. This illustrates that apart for the cost due to the Ts timer, the computational cost for bundling, Cb, is lower than no bundling by the factor Mn. In both Pre- and Post-bundling the average delay becomes Db=(1/Ar)/Mn, and the maximum delay is Db=Ts−(Ts−Mn/Ar). In this case it's even clearer how bundling has significant advantages over no bundling, even when talking about the added delay.

As described above, the different parameters may be characteristic of a current situation and the threshold may be determined based on at least one of the (i) supervision timer indicating a period of time the network node should wait, unless the TLP is full, before transmitting one or more received ULPs, (ii) the size of the TLP, (iii) the size of the ULP, (iv) the number of ULPs, (v) the rate of incoming data, bytes or ULPs, (vi) computational cost for not employing bundling, (vii) computational cost for employing bundling, (viii) computational cost for the supervision timer, (ix) computational delay for not employing bundling, and (x) computational delay for employing bundling.

A weakness of bundling is the fixed delay that bundling adds when Ar is lower than a certain level that may be estimated as $$\frac{1}{Ts} \le Ar \le \frac{Mn}{Ts}$$

and this may be enough to avoid bundling for applications that require a strict low latency.

In the manner described above, the method described above performed by the transmitting entity for transmitting one or more data packets to a receiving entity may also be referred to as a method for adaptive bundling, since the method comprises determining whether or not to employ bundling on ULP(s) that may be subject for bundling. Thus, instead of a strict division between ULPs that shall be bundled and ULPs that must not be bundled according to different requirements on e.g. delay; also the ULPs that shall be bundled according to the strict division may not be bundled if the circumstances are such that it might be unfavourable to bundle them.

Thus, adaptive bundling, e.g. the method described above may make use of a set of tools and procedures that allows to take the advantages of bundling, that is low computational costs and low ULP delay at medium and high traffic rates as well as the low latency at medium and low traffic rates that is a characteristic of no bundling. In an illustrative example shown in FIG. 2a, the adaptive bundling may exploit a "traffic meter" 220 that provides runtime measurement of the ULP arrival rate, Ar. Such a traffic meter may then feed a decision state-machine that drives a bundling machine.

Figure 2A:
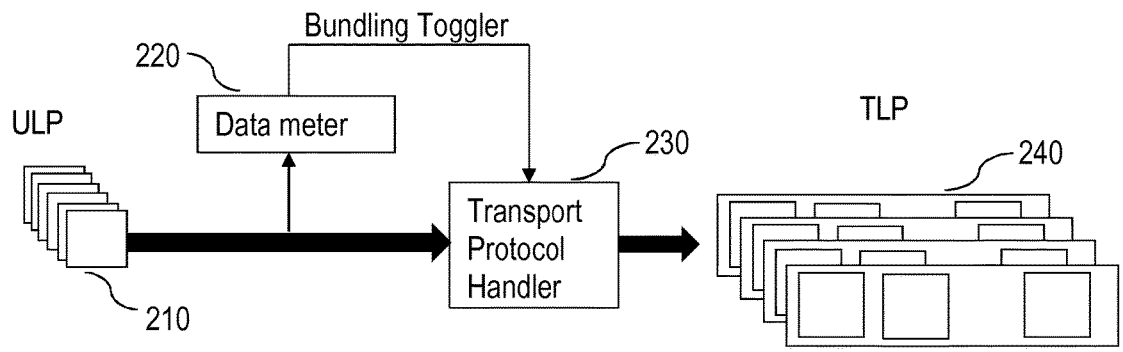
FIG. 2a is an illustration of an example of an architecture for an adaptive bundling mechanism.

FIG. 2a illustrates an example of an architecture for an adaptive bundling mechanism comprising a data meter, 220, a transport protocol handler 230 and a bundling toggler.

The data meter entity 220 is a tool that measures the amount of ULPs being sent from the application, or an upper layer protocol to the transport layer protocol. According to e.g. an inference mechanism, the data meter entity 220 provides the bundling toggler with information that is used for deciding when bundling is to be done and/or when bundling is not to be done. The data meter entity 220 may calculate the amount of traffic continuously; calculation can be done in terms of ULP/sec or bytes/sec. The Inference mechanism operates according to $$Th = \Upsilon \frac{Ps(t)}{Ts},$$

where γ is a policy or value that determines the behaviour of the mechanism, it has range starting from Mn and may actually set the value for a bundling algorithm to start operating. Th is the threshold. The choice of Y can be done statically or run-time, being decided for instance by the total load on computing resources used for TLP, or otherwise by the total load of the transport layer, or by any other function f that behaves according to the law.

$$\Upsilon \propto f\left(\left\|\frac{load_{max}}{load}\right\|\right).$$

This means that Y will increase when the load is low, and will decrease with high load. For γ<1 the average delay of adaptive bundling is zero while $$Ar < \frac{Th}{Ts}$$

then it becomes identical to the bundling strategy adopted. In such case adaptive bundling delay is always better or equal than any other bundling strategy, and it's equal to the no-bundling case up the threshold value is reached.

The maximum delay is equal to no-bundling case up to the threshold value is chosen, when the threshold value is exceeded it gets the same value as the adopted bundling strategy.

The computational cost for adaptive bundling is denoted Cab, and the computational delay for employing adaptive bundling is denoted Dab. The Cab is proportional to the TLP transmission rate.

For Ar<(Ps*Ts) the cost for adaptive bundling is Cab=Ct+K*Ar.

For Ar≥(Ps*Ts) the cost for adaptive bundling is Cab=Ct+K*Ar/Mn.

For $\gamma \geq 1$ the average delay of adaptive bundling is zero until Ar<(Y*Ts) then it becomes equal to the bundling's, that is Db=Ts−(Ts−Mn/Ar). The computational cost for Adaptive Bundling is still only depending on TLP transmission rate. For Ar<(Y*Ps*Ts) the cost for adaptive bundling is Cab=Ct+K*Ar. For Ar≥(Y*Ps*Ts) the cost for adaptive bundling is Cab=Ct+K*Ar/Mn.

The transport protocol handler 230 is the object or arrangement implementing a transport protocol that is used for transporting multiple instances of ULPs. Depending on the network architecture, the transport protocol handler 230 may use different technologies, as for instance Internet Protocol, IP, Transmission Control Protocol, TCP, Stream Control Transmission Protocol, SCTP.

The bundling toggler is an interface that allows bundling functionality belonging to the transport protocol handler 230 to be enabled and/or disabled.

In FIG. 2a, the data flow is assumed to be originated as a stream of ULPs from an external upper layer client such as the application described above, then ULPs are received by the data meter 220 as well as by the transport protocol handler 230. ULPs are packed into a TLP inside the transport protocol handler 230, and depending on the Data Meter decision, they are bundled or not.

The adaptive bundling is getting the benefit of bundling technics when it is worth to use it. This creates a unique behaviour both in Central Processing Unit, CPU, usage and in traffic profile.

Figure 2B:
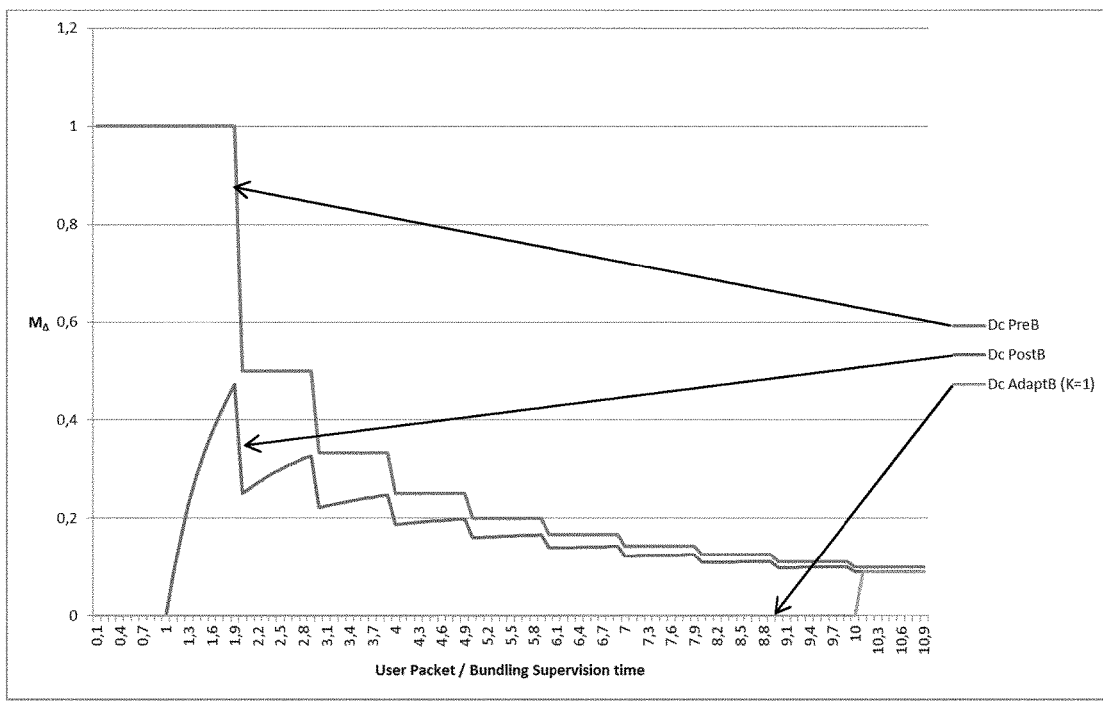
FIG. 2b is a graph illustrating a transmission delay as a function of a rate of incoming data, bytes or User Layer Packets, ULPs.

As described above, pre-bundling is introducing a fixed delay, equals the bundling supervision time, per ULP, so once the inter-arrival packet time is higher than the bundling supervision time, and such a delay is the highest latency introduced by the algorithm, from now called $M_A$. It is decreasing its weight directly to the inter-arrival packet time. Post-bundling, instead, starts to introduce bundling supervision time once the ULP inter-arrival time is less than the bundling supervision time itself. Increasing the inter-arrival packet time will let the delay of post-bundling behave as the pre-bundling one. Instead, the adaptive bundling delay remains zero until the ULP inter-arrival time is higher enough to activate the bundling toggle and then it should show a behaviour aligned to previously known standard bundling algorithms. See also the graph in FIG. 2b illustrating delay as a function of Ar.

Figure 2C:
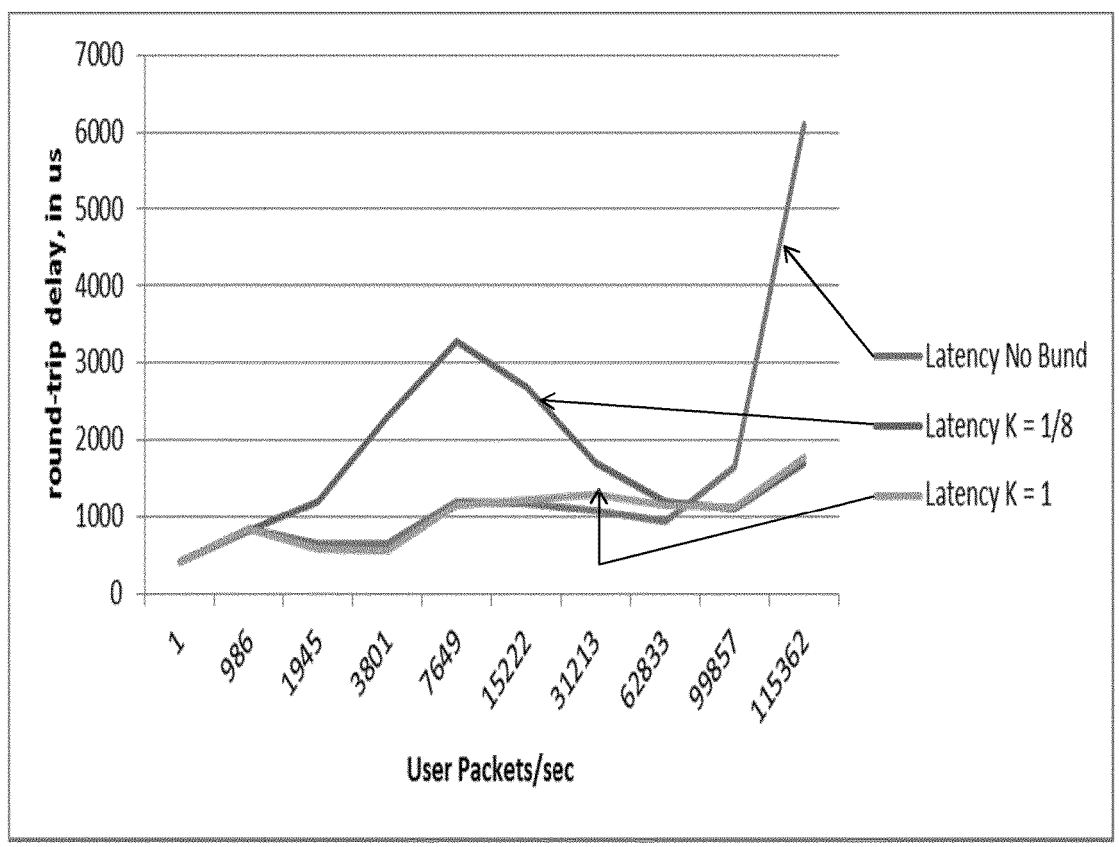
FIG. 2c is a graph illustrating a round-trip delay as a function of number of ULPs per second.

The theoretical computation of introduced latency is visible in the real traffic profile. Sniffing the round-trip delay between a traffic generator and a node using different bundling algorithms is able both to show the latency as described theoretically before and the protocol computing contribution to the delay, expected to increase exponentially for the no-bundling algorithm once the ULP inter-arrival time begins significant. The result shows: The pre-bundling has higher delay for low traffic rate; the typical hump of post-bundling (in FIG. 2c simulated using K=⅛ for adaptive bundling); the exponential delay of protocol computing for high traffic rate for no-bundling algorithm; and the fitting of adaptive bundling to the most efficient profile depending on the traffic rate.

Embodiments herein also relate to a transmission entity for transmitting one or more data packets to a receiving entity, wherein the transmitting entity and the receiving entity are operable in a communication network. The transmitting entity has the same technical features, objects and advantages as the method performed by the transmitting entity. The transmitting entity will thus only be described in brief in order to avoid unnecessary repetition. Embodiments of the transmitting entity will be briefly described with reference to FIGS. 3 and 4.

Figure 3:
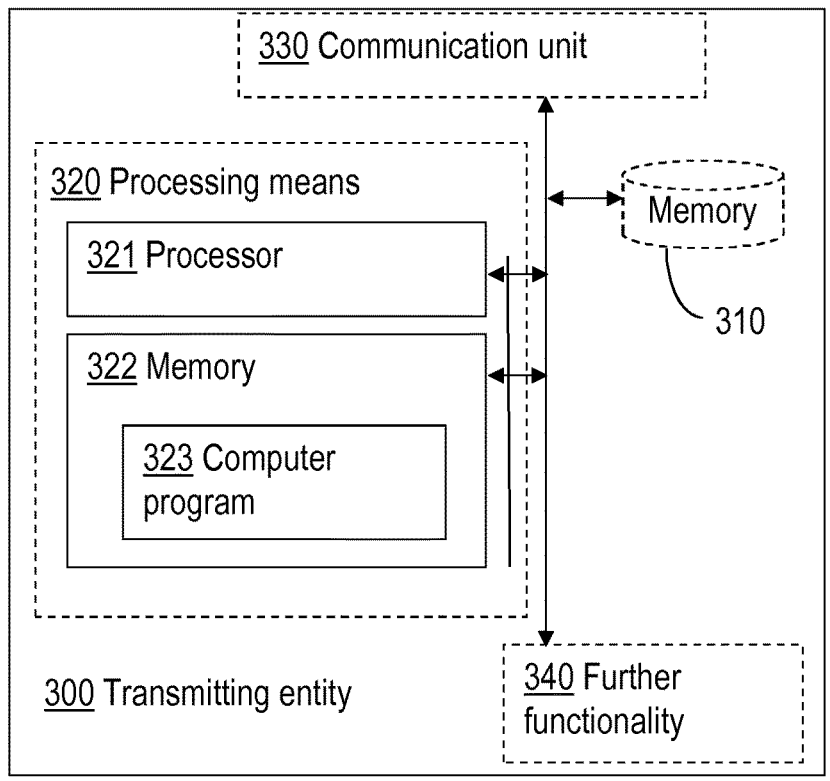
FIG. 3 is a block diagram of a transmitting entity for transmitting one or more data packets to a receiving entity according to another exemplifying embodiment.
Figure 4:
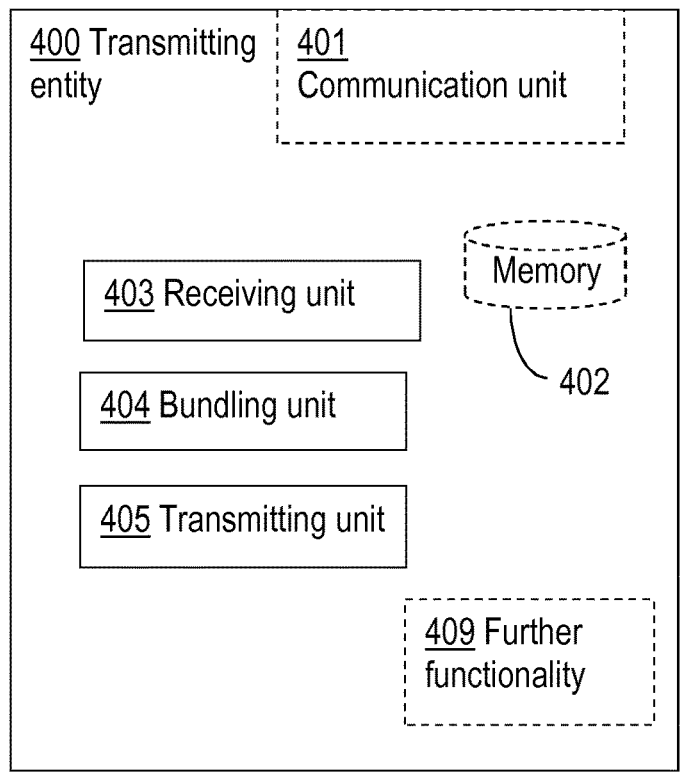
FIG. 4 is a block diagram of a transmitting entity for transmitting one or more data packets to a receiving entity according to an exemplifying embodiment.

FIGS. 3 and 4 illustrate the transmitting entity 300, 400 being configured for receiving, from an application, a ULP, to be transmitted by means of a TLP, to the receiving entity; bundling the received ULP together with one or more additional received ULPs in a TLP when a rate of incoming data, bytes or ULPs from the application meets a threshold; and transmitting the TLP to the receiving entity.

The transmitting entity may be realised on implemented in various ways. A first exemplifying realisation or implementation is illustrated in FIG. 3. FIG. 3 illustrates the transmitting entity 300 comprising a processor 321 and memory 322, the memory comprising instructions, e.g. by means of a computer program 323, which when executed by the processor 321 causes the transmitting entity 300 to receive, from an application, a ULP, to be transmitted by means of a TLP, to the receiving entity; to bundle the received ULP together with one or more additional received ULPs in a TLP when a rate of incoming data, bytes or ULPs from the application meets a threshold; and to transmit the TLP to the receiving entity.

FIG. 3 also illustrates the transmitting entity 300 comprising a memory 310. It shall be pointed out that FIG. 3 is merely an exemplifying illustration and memory 310 may be optional, be a part of the memory 322 or be a further memory of the transmitting entity 300. The memory may for example comprise information relating to the transmitting entity 300, to statistics of operation of the transmitting entity 300, just to give a couple of illustrating examples. FIG. 3 further illustrates the transmitting entity 300 comprising processing means 320, which comprises the memory 322 and the processor 321. Still further, FIG. 3 illustrates the transmitting entity 300 comprising a communication unit 330. The communication unit 330 may comprise an interface through which the transmitting entity 300 communicates with other nodes or entities of the communication network as well as other communication units. FIG. 3 also illustrates the transmitting entity 300 comprising further functionality 340. The further functionality 340 may comprise hardware of software necessary for the transmitting entity 300 to perform different tasks that are not disclosed herein.

An alternative exemplifying realisation, or implementation, of the transmitting entity 300, 400 is illustrated in FIG. 4. FIG. 4 illustrates the transmitting entity 400 comprising a receiving unit 403 for receiving, from an application, a ULP, to be transmitted by means of a TLP, to the receiving entity. FIG. 4 also illustrates the transmitting entity 400 comprising a bundling unit 404 for bundling the received ULP together with one or more additional received ULPs in a TLP when a rate of incoming data, bytes or ULPs from the application meets a threshold; and a transmitting unit 405 for transmitting the TLP to the receiving entity.

In FIG. 4, the transmitting entity 400 is also illustrated comprising a communication unit 401. Through this unit, the transmitting entity 400 is adapted to communicate with other nodes and/or entities in the communication network. The communication unit 401 may comprise more than one receiving arrangement. For example, the communication unit 401 may be connected to both a wire and an antenna, by means of which the transmitting entity 400 is enabled to communicate with other nodes and/or entities in the communication network. Similarly, the communication unit 401 may comprise more than one transmitting arrangement, which in turn is connected to both a wire and an antenna, by means of which the transmitting entity 400 is enabled to communicate with other nodes and/or entities in the communication network. The transmitting entity 400 further comprises a memory 402 for storing data. Further, the transmitting entity 400 may comprise a control or processing unit (not shown) which in turn is connected to the different units 403-405. It shall be pointed out that this is merely an illustrative example and the transmitting entity 400 may comprise more, less or other units or modules which execute the functions of the transmitting entity 400 in the same manner as the units illustrated in FIG. 4.

It should be noted that FIG. 4 merely illustrates various functional units in the transmitting entity 400 in a logical sense. The functions in practice may be implemented using any suitable software and hardware means/circuits etc. Thus, the embodiments are generally not limited to the shown structures of the transmitting entity 400 and the functional units. Hence, the previously described exemplary embodiments may be realised in many ways. For example, one embodiment includes a computer-readable medium having instructions stored thereon that are executable by the control or processing unit for executing the method steps in the transmitting entity 400. The instructions executable by the computing system and stored on the computer-readable medium perform the method steps of the transmitting entity 400 as set forth in the claims.

The transmitting entity has the same possible advantages as the method performed by the transmitting entity. One possible advantage is adaptive bundling may provide a better CPU resource utilisation than no-bundling option at a similar latency. Another possible advantage is that adaptive bundling may provide a higher traffic capacity than no-bundling and a better latency with high traffic figures. Still a possible advantage is that adaptive bundling may provide latency than any other bundling mechanism with low and medium traffic figures, and the same latency than other bundling mechanism at high traffic figures. Yet a possible advantage is that adaptive bundling may provide the possibility to tune-up the bundling feature according to the actual CPU utilisation, thus optimising the resource utilisation.

According to an embodiment, the transmitting entity is further configured for inserting the received ULP in the TLP without bundling it together with any additional received ULPs when the rate of incoming bytes or ULPs does not meet the threshold, and transmitting the TLP to the receiving entity.

According to yet an embodiment, the bundling comprises determining the rate of incoming data, bytes or ULPs from the application.

According to still an embodiment, the threshold is determined at least partly based on whether the bundling scheme is based on pre-bundling or post-bundling, wherein (a) pre-bundling comprises starting a supervision timer at the reception of the ULP from the application and waiting until the timer expires or the TLP is full before transmitting the TLP, and (b) post-bundling comprises transmitting the ULP as soon as it is received from the application in the TLP, starting the supervision timer and waiting until the supervision timer expires or the TLP is full until a subsequent TLP is transmitted comprising one or more ULPs.

According to a further embodiment, the threshold is determined at least partly based on one or more of (i) a supervision timer indicating a period of time the network node should wait, unless the TLP is full, before transmitting one or more received ULPs, (ii) the size of the TLP, (iii) the size of the ULP, (iv) the number of ULPs, (v) the rate of incoming data, bytes or ULPs, (vi) computational cost for not employing bundling, (vii) computational cost for employing bundling, (viii) computational cost for the supervision timer, (ix) computational delay for not employing bundling, and (x) computational delay for employing bundling.

Figure 5:
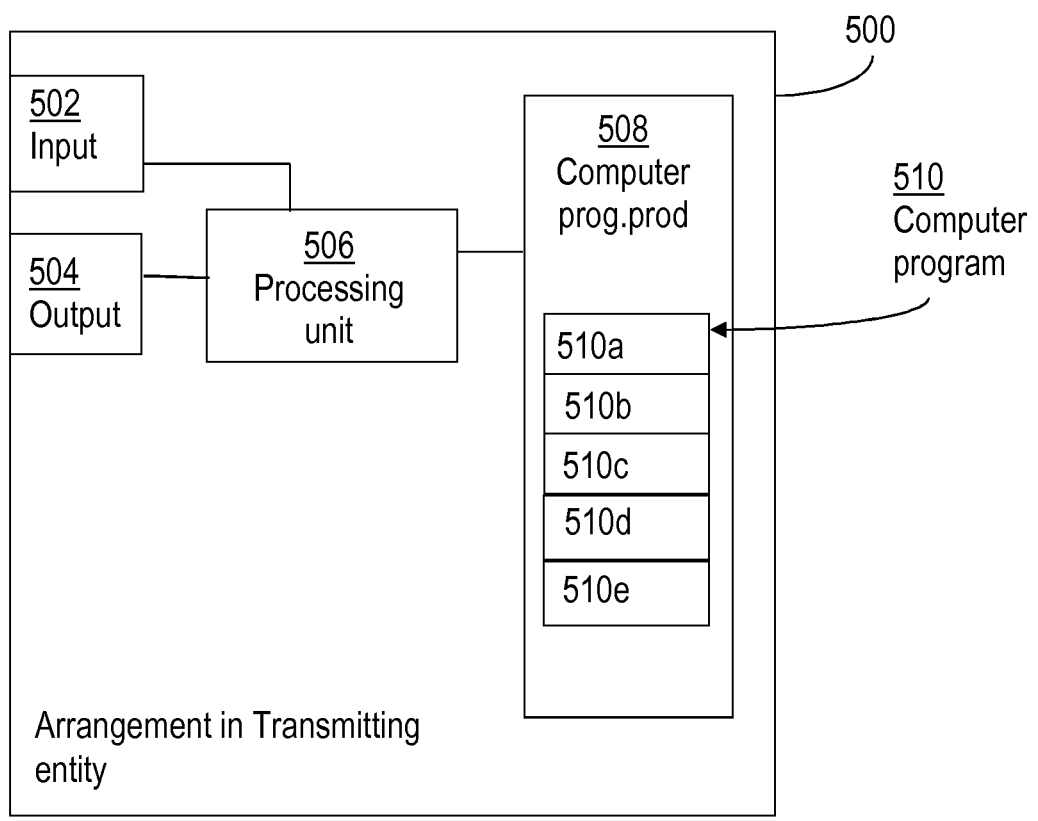
FIG. 5 is a block diagram of an arrangement in a transmitting entity for transmitting one or more data packets to a receiving entity according to another exemplifying embodiment.

FIG. 5 schematically shows an embodiment of an arrangement 500 in transmitting entity 400. Comprised in the arrangement 500 in the transmitting entity 400 are here a processing unit 506, e.g. with a Digital Signal Processor, DSP. The processing unit 506 may be a single unit or a plurality of units to perform different actions of procedures described herein. The arrangement 500 of the transmitting entity 400 may also comprise an input unit 502 for receiving signals from other entities, and an output unit 504 for providing signal(s) to other entities. The input unit and the output unit may be arranged as an integrated entity or as illustrated in the example of FIG. 4, as one or more interfaces 401.

Furthermore, the arrangement 500 in the transmitting entity 400 comprises at least one computer program product 508 in the form of a non-volatile memory, e.g. an Electrically Erasable Programmable Read-Only Memory, EEPROM, a flash memory and a hard drive. The computer program product 508 comprises a computer program 510, which comprises code means, which when executed in the processing unit 506 in the arrangement 500 in the transmitting entity 400 causes the transmitting entity to perform the actions e.g. of the procedure described earlier in conjunction with FIGS. 1a-1b.

The computer program 510 may be configured as a computer program code structured in computer program modules 510a-510e. Hence, in an exemplifying embodiment, the code means in the computer program of the arrangement 500 in the transmitting entity 400 comprises a receiving unit, or module, for receiving, from an application, a ULP, to be transmitted by means of a TLP, to the receiving entity; and a bundling unit, or module, for bundling the received ULP together with one or more additional received ULPs in a TLP when a rate of incoming data, bytes or ULPs from the application meets a threshold. Further, the computer program of the arrangement 500 in the transmitting entity 400 comprises a transmitting unit, or module, for transmitting the TLP to the receiving entity.

The computer program modules could essentially perform the actions of the flow illustrated in FIGS. 1a-1b, to emulate the transmitting entity 400. In other words, when the different computer program modules are executed in the processing unit 506, they may correspond to the units 403-405 of FIG. 4.

Although the code means in the respective embodiments disclosed above in conjunction with FIG. 4 are implemented as computer program modules which when executed in the respective processing unit causes the transmitting entity to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the transmitting entity.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a transmitting entity for transmitting one or more data packets to a receiving entity, the transmitting entity and the receiving entity being operable in a communication network, the method comprising:
receiving, from an application, a user layer packet (ULP) to be transmitted by means of a transport layer packet (TLP) to the receiving entity;
determining whether to employ bundling based on comparing a rate of incoming data, bytes or ULPs from the application with a threshold, wherein the threshold is determined based on computational delay for not employing bundling and computational delay for employing bundling;
bundling the received ULP together with one or more additional received ULPs in the TLP when the rate of incoming data, bytes or ULPs from the application meets the threshold; and
transmitting the TLP to the receiving entity.

2. The method according to claim 1, further comprising inserting the received ULP in the TLP without bundling the received ULP together with any additional received ULPs when the rate of incoming data, bytes or ULPs from the application does not meet the threshold.

3. The method according to claim 1, further comprising determining the rate of incoming data, bytes or ULPs from the application.

4. The method according to claim 1, wherein the bundling comprises pre-bundling or post-bundling, wherein the pre-bundling comprises starting a supervision timer at the reception of the ULP from the application and waiting until the supervision timer expires or the TLP is full before transmitting the TLP, and wherein the post-bundling comprises transmitting the ULP as soon as the ULP is received in the TLP from the application, starting the supervision timer after transmitting the ULP, and waiting until the supervision timer expires or a subsequent TLP is full before the subsequent TLP, comprising one or more ULPs, is transmitted.

5. The method according to claim 1, wherein the threshold is further determined at least partly based on one or more of: (i) a supervision timer indicating a period of time a network node should wait, unless the TLP is full, before transmitting the one or more additional received ULPs, (ii) the size of the TLP, (iii) the size of the ULP, (iv) the number of ULPs, (v) the rate of incoming data, bytes or ULPs from the application, (vi) computational cost for not employing bundling, (vii) computational cost for employing bundling, and (viii) computational cost for the supervision timer.

6. A network node for transmitting one or more data packets to a receiving entity, the network node and the receiving entity being operable in a communication network, the network node comprising at least one processor, the at least one processor being configured to:
receive, from an application, a user layer packet (ULP) to be transmitted by means of a transport layer packet (TLP) to the receiving entity;
determine whether to employ bundling based on a comparison of a rate of incoming data, bytes or ULPs from the application with a threshold, wherein the threshold is determined based on computational delay for not employing bundling and computational delay for employing bundling;
bundle the received ULP together with one or more additional received ULPs in the TLP when the rate of incoming data, bytes or ULPs from the application meets the threshold; and
transmit the TLP to the receiving entity.

7. The network node according to claim 6, the at least one processor further being configured to insert the received ULP in the TLP without bundling the received ULP together with any additional received ULPs when the rate of incoming data, bytes or ULPs from the application does not meet the threshold.

8. The network node according to claim 6, the at least one processor further being configured to determine the rate of incoming data, bytes or ULPs from the application.

9. The network node according to claim 6, wherein to bundle, the at least one processor is configured to perform pre-bundling or post-bundling, wherein the pre-bundling comprises starting a supervision timer at the reception of the ULP from the application and waiting until the supervision timer expires or the TLP is full before transmitting the TLP, and wherein the post-bundling comprises transmitting the ULP as soon as the ULP is received in the TLP from the application, starting the supervision timer after the transmission of the ULP, and waiting until the supervision timer expires or a subsequent TLP is full before the subsequent TLP, comprising one or more ULPs, is transmitted.

10. The network node according to claim 6, wherein the threshold is further determined at least partly based on one or more of: (i) a supervision timer indicating a period of time the network node should wait, unless the TLP is full, before transmitting the one or more additional received ULPs, (ii) the size of the TLP, (iii) the size of the ULP, (iv) the number of ULPs, (v) the rate of incoming data, bytes or ULPs from the application, (vi) computational cost for not employing bundling, (vii) computational cost for employing bundling, and (viii) computational cost for the supervision timer.

11. A non-transitory computer-readable medium comprising computer readable code which, when run on a processor comprised in an arrangement in a network node, causes the network node to perform the method according to claim 1.

\* \* \* \* \*